(12) United States Patent
Chiang et al.

(10) Patent No.: US 12,015,332 B2
(45) Date of Patent: Jun. 18, 2024

(54) POWER SUPPLY AND POWER SAVING METHOD THEREOF

(71) Applicant: FSP TECHNOLOGY INC., Taoyuan (TW)

(72) Inventors: Chang-Hsun Chiang, Taoyuan (TW); Yung-Hsiang Shih, Taoyuan (TW)

(73) Assignee: FSP TECHNOLOGY INC., Taoyuan (TW)

( * ) Notice: Subject to any disclaimer, the term of this patent is extended or adjusted under 35 U.S.C. 154(b) by 273 days.

(21) Appl. No.: 17/580,603

(22) Filed: Jan. 20, 2022

(65) Prior Publication Data

US 2022/0294331 A1 Sep. 15, 2022

(30) Foreign Application Priority Data

Mar. 9, 2021 (TW) .................. 110108260

(51) Int. Cl.
*H02M 1/00* (2007.01)
*G01K 7/22* (2006.01)
*G06F 1/3206* (2019.01)
*G06F 1/3296* (2019.01)
*H02M 1/08* (2006.01)
*H02M 1/42* (2007.01)

(52) U.S. Cl.
CPC .......... *H02M 1/0035* (2021.05); *G01K 7/22* (2013.01); *G06F 1/3206* (2013.01); *G06F 1/3296* (2013.01); *H02M 1/0006* (2021.05); *H02M 1/0054* (2021.05); *H02M 1/08* (2013.01); *H02M 1/4208* (2013.01)

(58) Field of Classification Search
CPC ............ H02M 1/0006; H02M 1/0035; H02M 1/0054; H02M 1/08; H02M 1/4208; G01K 7/22; G06F 1/3206; G06F 1/3296
USPC ............................................. 363/84
See application file for complete search history.

(56) References Cited

U.S. PATENT DOCUMENTS

| 5,745,375 A | * | 4/1998 | Reinhardt | ........... G06F 9/30083 712/E9.035 |
| 2005/0116697 A1 | * | 6/2005 | Matsuo | ............... H02M 3/1584 323/282 |
| 2006/0263031 A1 | * | 11/2006 | Schiff | .................. H02M 3/156 385/147 |

* cited by examiner

*Primary Examiner* — Yemane Mehari
(74) *Attorney, Agent, or Firm* — Winston Hsu

(57) ABSTRACT

A power supply and a power saving method thereof are provided. The power saving method includes: utilizing a monitoring circuit within the power supply to generate a monitoring signal according to operating loading of the power supply; and utilizing a control signal generating circuit within the power supply to generate a control signal according to the monitoring signal, to drive at least two switch transistors within a circuitry within the power supply, wherein the switch transistors are connected in parallel.

10 Claims, 3 Drawing Sheets ns are connected in parallel. In addition, the monitoring circuit is configured to generate a monitoring signal according to operating loading of the power supply. The control signal generating circuit is configured to generate a control signal, according to the monitoring signal, to drive the switch transistors.

POWER SUPPLY AND POWER SAVING METHOD THEREOF

BACKGROUND OF THE INVENTION

1. Field of the Invention

The present invention is related to power saving methods of central processing units, and more particularly, to a power supply and a power saving method thereof.

2. Description of the Prior Art

A power supply converts alternating current (AC) power into direct current (DC) power, and provides driving voltages to electronic devices. If power consumption of the power supply operating in an extremely light loading status is reduced, efficiency of the power supply can be improved and the power supply can achieve greater power saving.

Developments in semiconductor manufacturing have led to chip manufacturers' greater focus on improving efficiency of the power supply output power. Furthermore, with the problems of energy shortage and global warming, specifications related to saving power have become stricter. In particular, Intel Guidelines demand efficiency of the power supply under the extremely light loading status. For example, Intel Guidelines demand that, when the power supply is under the extremely light loading status (e.g., for a power supply having an output power over 500 W, the loading output thereof is 2%; or for a power supply having an output power below 500 W, the loading output thereof is 12 W), the efficiency thereof needs to be over 60%. It is expected that efficiency under the extremely light loading status may be required to be over 70% in the future. Due to these considerations, power management of the power supply under the extremely light loading status has become an important issue in the field.

Related art methods for reducing power consumption of the power supply have still not achieved sufficiently low levels, however. Thus, development of power supplies which have extremely low power consumption under the extremely light loading status is a priority.

SUMMARY OF THE INVENTION

An objective of the present invention is to provide a power supply and a power saving method thereof which can reduce overall power consumption of the power supply under the extremely light loading status.

At least one embodiment of the present invention provides a power saving method, wherein the power saving method is applicable to a power supply. The power saving method may comprise: utilizing a monitoring circuit within the power supply to generate a monitoring signal according to operating loading of the power supply; and utilizing a control signal generating circuit within the power supply to generate a control signal according to the monitoring signal, to drive at least two switch transistors within a circuitry within the power supply, wherein the switch transistors are connected in parallel.

At least one embodiment of the present invention further provides a power supply, wherein the power supply may comprise a circuitry, a monitoring circuit, and a control signal generating circuit coupled between the circuitry and the monitoring circuit. The circuitry is configured to execute a partial operation of the power supply, wherein the circuitry comprises at least two switch transistors, and the switch transistors are connected in parallel. In addition, the monitoring circuit is configured to generate a monitoring signal according to operating loading of the power supply. The control signal generating circuit is configured to generate a control signal, according to the monitoring signal, to drive the switch transistors.

The power supply and the power saving method provided by the embodiments of the present invention can effectively reduce the power consumption of a whole system under an extremely light loading status thereof by reducing a voltage level which is configured to drive the switch transistors or by controlling the number of the switch transistors being enabled.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
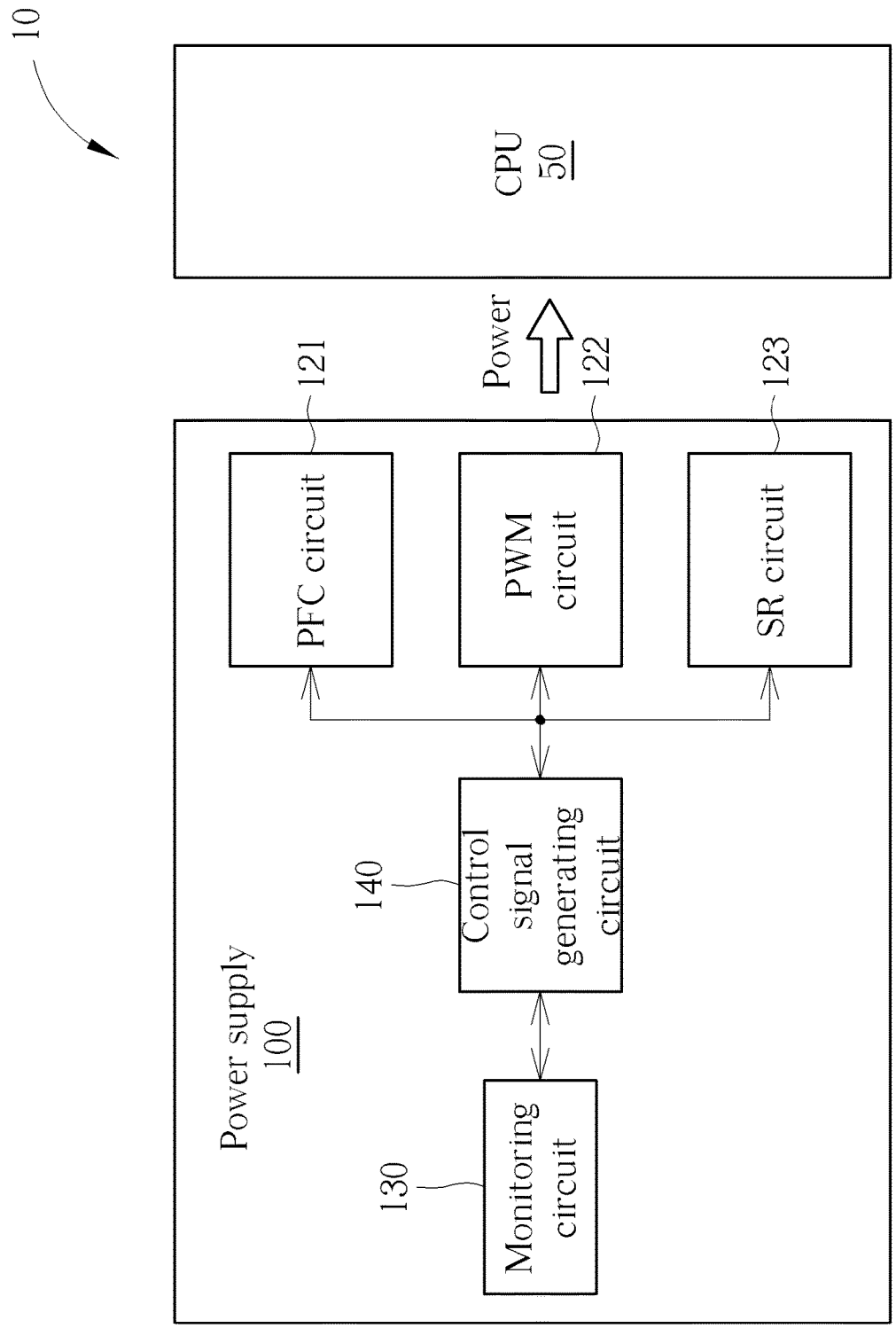
FIG. 1 is a diagram illustrating an electronic device according to an embodiment of the present invention.

FIG. 1 is a diagram illustrating an electronic device 10 according to an embodiment of the present invention. The electronic device 10 may comprise a power supply 100 and a central processing unit (CPU) 50, and the power supply 100 is configured to provide power to the CPU 50, in order to allow the CPU 50 to perform operations. In this embodiment, the power supply 100 comprises a circuitry (such as an internal circuit of the power supply 100) for executing a partial operation of the power supply 100. The circuitry comprises at least one switch component, and the switch component is formed by at least two switch transistors (e.g., two or more switch transistors), where these switch transistors are connected in parallel. The circuitry may be a power factor correction (PFC) circuit 121, a pulse-width modulation (PWM) circuit 122 and/or a synchronous rectification (SR) circuit 123, but the present invention is not limited thereto. Any internal circuit utilizing at least two switch transistors for a switch function can be an example of the circuitry. In addition, the power supply 100 further comprises a monitoring circuit 130 and a control signal generating circuit 140, where the control signal generating circuit 140 is coupled between the circuitry (e.g., at least one of the PFC circuit 121, the PWM circuit 122 and the SR circuit 123) and the monitoring circuit 130. In this embodiment, all of the PFC circuit 121, the PWM circuit 122 and the SR circuit 123 is coupled to the control signal generating circuit 140, but this is for illustrative purposes only, and is not meant to be a limitation of the present invention.

Figure 2:
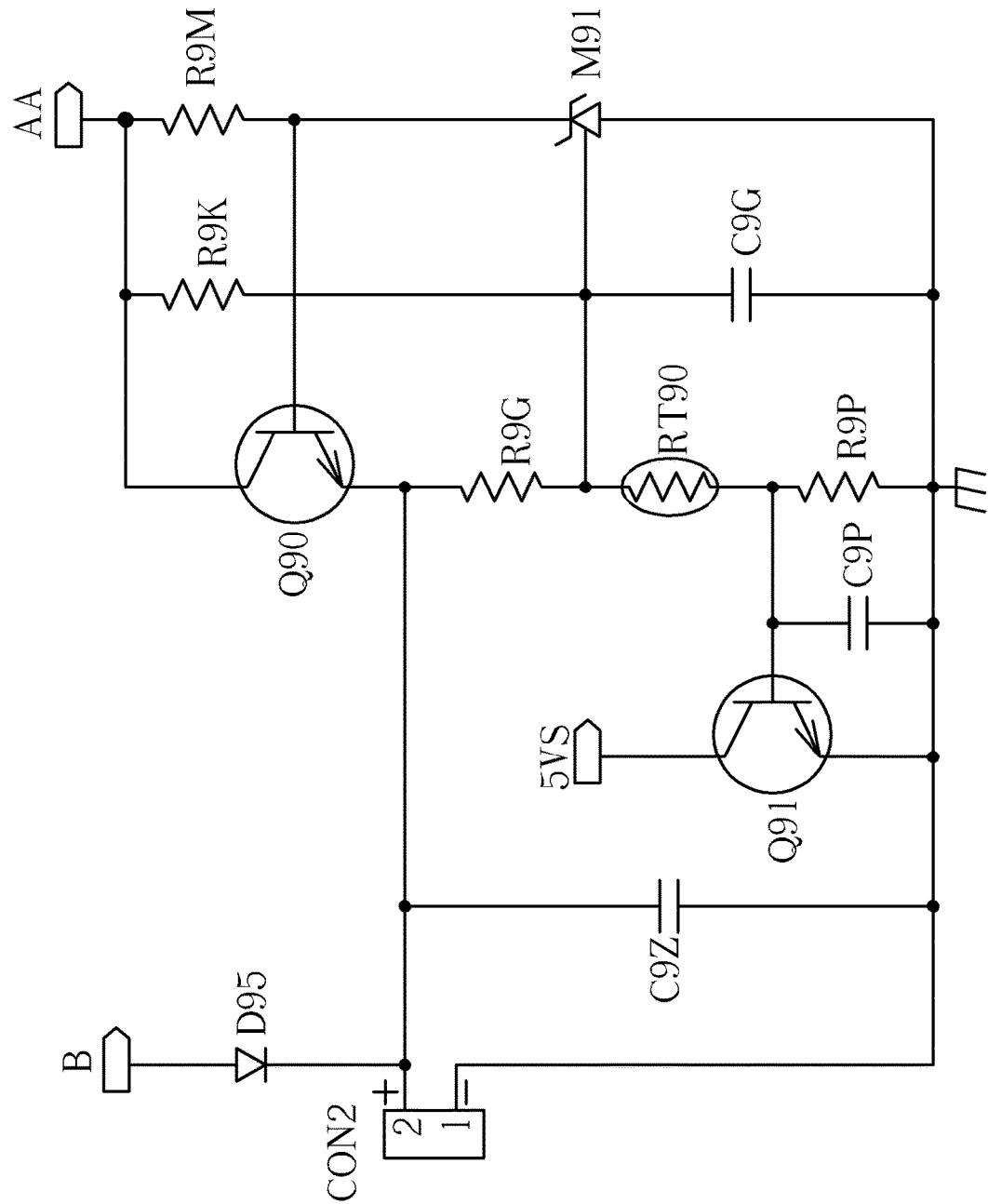
FIG. 2 is a diagram illustrating a monitoring circuit shown in FIG. 1 according to an embodiment of the present invention.

In this embodiment, the monitoring circuit 130 may generate a monitoring signal according to operating loading of the power supply 100. The monitoring circuit 130 may be a temperature control circuit as shown in FIG. 2. The temperature control circuit comprises at least one thermistor, where resistance of the thermistor may vary according to an operating temperature of the power supply 100. The temperature control circuit generates the monitoring signal according to the operating temperature and thereby utilizes the monitoring signal to indicate the operating temperature of the power supply 100. As shown in FIG. 2, the temperature control circuit may comprise a thermistor RT90, and may further comprise resistors R9G, R9P, R9K and R9M, capacitors C9Z, C9P and C9G, transistors Q91 and Q90 (e.g., bipolar junction transistors or metal-oxide-semiconductor field-effect transistors), a voltage regulator M91 and a diode D95. The temperature control circuit may operate under supply voltages B, AA and 5VS, and utilize an output port CON2 to output the monitoring signal. The temperature control circuit is not limited to the architecture shown in FIG. 2, and the monitoring circuit 130 is not limited to utilize the thermistor to generate the monitoring signal. As long as the operating temperature of the power supply 100 may be detected to make the monitoring signal have different voltage levels under different temperatures, alternative implementations of the monitoring circuit 130 should belong to the scope of the present invention. In addition, the control signal generating circuit 140 may generate a control signal according to the monitoring signal. The monitoring signal is for driving the switch transistors. More particularly, a voltage level of the control signal according to the monitoring signal, or a number of conductive switch transistors among the switch transistors may be controlled according to the monitoring signal.

In the related art, if the highest voltage level and the lowest voltage level received by a certain module circuit (e.g., an internal circuit) within a power supply are VDD and GND respectively, the module circuit typically utilizes a signal having the voltage level VDD to conduct a switch component within the module circuit. An embodiment of the present invention provides a novel operation mechanism, which makes the power supply 100 drive gate terminals of switch transistors within this switch component with the voltage level VDD to conduct this switch component under a heavy loading status (e.g., when the CPU 50 is in a working status). If the power supply 100 operates under an extremely light loading status (e.g., the CPU 50 operates under a low rotating speed), the control signal generating circuit 140 within the power supply 100 can conduct this switch component by applying a voltage level lower than the original VDD to the gate terminals of the switch transistors, in order to reduce power consumption introduced by switching of the switch component and thereby improve output power efficiency.

In detail, total loss P of the switch transistors at least comprise switching loss $P_{ds}$ and conducting loss $P_{on}$, where impact of the switching loss $P_{ds}$ is more significant under the extremely light loading status, and impact of the conducting loss $P_{on}$ is more significant under the heavy loading status. In practice, adopting some transistors with special materials, which are fast-switching and of small size such as Gallium nitride (GaN) components can effectively improve the efficiency of the power supply 100 under the heavy loading status. However, these types of switches have a higher cost, and may cause a higher transistor loss under the extremely light loading status. In general, the switching loss $P_{ds}$ and the conducting loss $P_{on}$ may be calculated by the following equation:

$$P_{ds} = \frac{1}{2} C_{iss} \times VDD^2 \times f$$

-continued
$$P_{on} = \frac{1}{2} C_{oss} \times V_B^2 \times f + I^2 \times R_{ds\_on}$$

Take TK20A60W of TOSHIBA as an example. If the voltage level VDD is modified to 12V from 18V, the switching loss can be roughly reduced by 56%. Further take TK10A60W of TOSHIBA as another example. If the voltage level VDD is modified to 10V from 18V, the switching loss can be roughly reduced by 69%.

One switch component may be implemented by multiple switch transistors connected in parallel. In the related art, gate terminals of these switch transistors are controlled by the same signal, and these switch transistors are concurrently conductive or concurrently not conductive. An embodiment of the present invention provides a novel operation mechanism, which makes the gate terminals of the switch transistors respectively controlled by corresponding signals. If the power supply 100 operates under the heavy loading status, these switch transistors are concurrently conductive when this switch component needs to be conductive. If the power supply 100 operates under the extremely light loading status, only a portion of the switch transistors (e.g., only one of them) is conductive when this switch component needs to be conductive, thereby reducing the power consumption of the switch component and further improving the output efficiency of the power supply 100.

When the power supply 100 operates normally (e.g., operating in the heavy loading status), the operating temperature thereof is relatively high. Besides, when the monitoring signal is detected to indicate that the operating temperature is greater than a predetermined threshold, the control signal generating circuit 140 makes the control signal have a relatively high voltage level for driving the switch transistors within the circuitry (e.g., at least one of the PFC circuit 121, the PWM circuit 122 and the SR circuit 123), and when the switch component needs to be conductive, all of the switch transistors therein may be conductive in order to output sufficient power.

When the power supply 100 operates in the extremely light loading status, the operating temperature thereof is relatively low. Besides, when the monitoring signal is detected to indicate that the operating temperature is less than the predetermined threshold, the control signal generating circuit 140 makes the control signal have a relatively low voltage level for driving the switch transistors within the circuitry (e.g., at least one of the PFC circuit 121, the PWM circuit 122 and the SR circuit 123). In particular, the control signal generating circuit 140 may lower the voltage level of the control signal which is configured to conduct the switch transistors (e.g., lowering to 12V or 10V from 18V), in order to reduce the switching loss $P_{ds}$ of the switch component. In another embodiment, the control signal may comprise multiple control bits respectively configured to drive the switch transistors, and the control signal generating circuit 140 may utilize settings of the multiple control bits to conduct only a portion of the switch transistors (e.g., only one switch transistor among three transistors is conductive) when the switch component needs to be conductive, so not all of the transistors are conductive, thereby preventing unnecessary power loss of the switch component.

Figure 3:
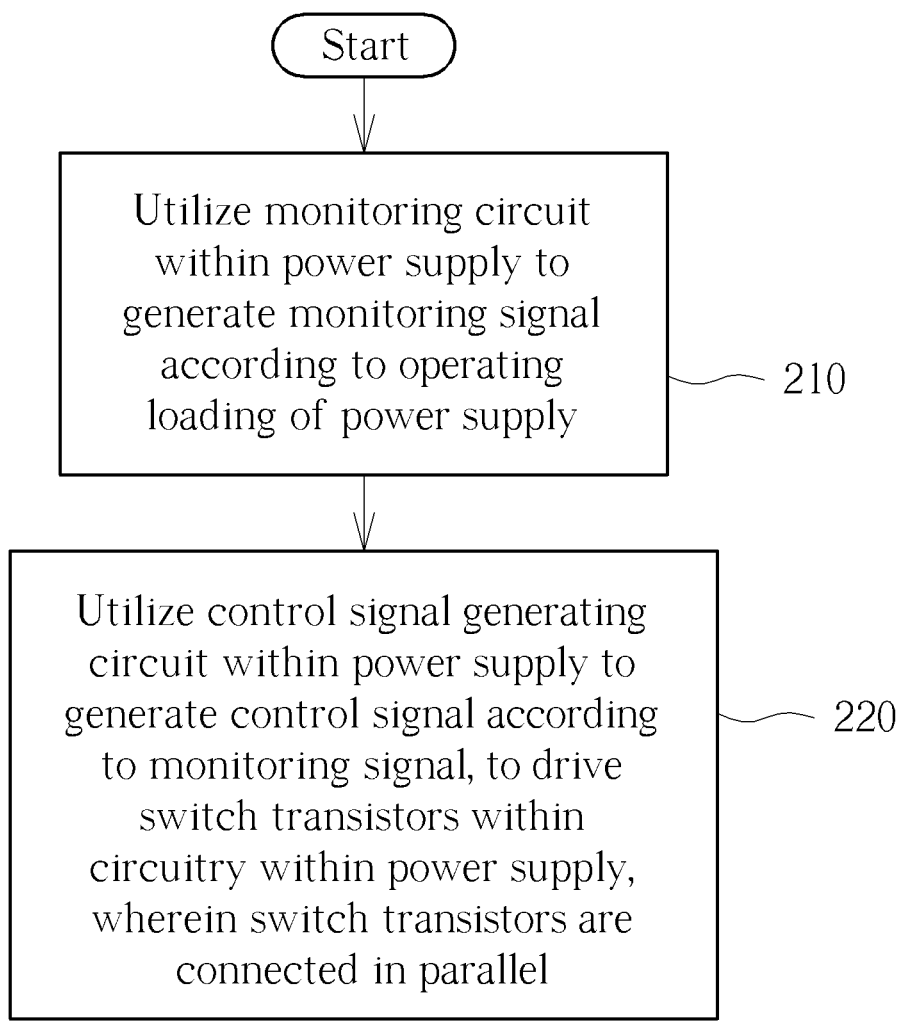
FIG. 3 is a diagram illustrating a working flow of a power saving method according to an embodiment of the present invention

FIG. 3 is a diagram illustrating a working flow of a power saving method according to an embodiment of the present invention, where the power saving method is applicable to the power supply 100 shown in FIG. 1. It should be noted that the working flow shown in FIG. 3 is for illustrative purposes only, and is not meant to be a limitation of the present invention. One or more steps in the working flow may be added, deleted or modified. If a same result can be obtained, these steps do not have to be executed in the exact order shown in FIG. 3.

In Step 210, the power supply 100 may utilize the monitoring circuit 130 therein to generate a monitoring signal according to operating loading of the power supply 100.

In Step 220, the power supply 100 may utilize the control signal generating circuit 140 therein to generate a control signal according to the monitoring signal, to drive at least two switch transistors within a circuitry (e.g., at least one of the PFC circuit 121, the PWM circuit 122 and the SR circuit 123) within the power supply 100, wherein the switch transistors are connected in parallel.

To summarize, when the power supply 100 of the embodiment of the present invention is in the extremely light loading state, a conductive voltage of the switch transistor may be lowered, or the number of conductive switch transistors among the switch transistors may be reduced, in order to reduce power consumption caused by switching of the switch transistors, and thereby improve the efficiency of the electronic device 10, and more particularly, the power supply 100.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power saving method of a power supply, comprising:
    utilizing a monitoring circuit within the power supply to generate a monitoring signal according to operating loading of the power supply; and
    utilizing a control signal generating circuit within the power supply to generate a control signal according to the monitoring signal, to drive at least two switch transistors within a circuitry within the power supply, wherein the switch transistors are connected in parallel;
    wherein the step of generating the control signal according to the monitoring signal to drive the switch transistors within the circuitry within the power supply comprises controlling a voltage level of the control signal according to the monitoring signal;
    wherein the step of controlling the voltage level of the control signal according to the monitoring signal comprises when the monitoring signal indicates that the power supply enters a light loading status, lowering the voltage level of the control signal which is configured to conduct the switch transistors by at least one-third.

2. The power saving method of claim 1, wherein the monitoring circuit is a temperature control circuit, and the monitoring signal is configured to indicate an operating temperature of the power supply.

3. The power saving method of claim 1, wherein the step of generating the control signal according to the monitoring signal to drive the switch transistors within the circuitry within the power supply comprises:
    controlling a number of conductive switch transistors among the switch transistors according to the monitoring signal.

4. The power saving method of claim 3, wherein the step of controlling the number of conductive switch transistors according to the monitoring signal comprises:
    when the monitoring signal indicates that the power supply enters a light loading status, conducting only one of the switch transistors.

5. The power saving method of claim 1, wherein the circuitry is a power factor correction circuit, a pulse-width modulation circuit or a synchronization rectification circuit.

6. A power supply, comprising:
    a circuitry configured to execute a partial operation of the power supply, wherein the circuitry comprises at least two switch transistors, and the switch transistors are connected in parallel;
    a monitoring circuit configured to generate a monitoring signal according to operating loading of the power supply; and
    a control signal generating circuit coupled between the circuitry and the monitoring circuit, and configured to generate a control signal, according to the monitoring signal, to drive the switch transistors;
    wherein the control signal generating circuit controls a voltage level of the control signal according to the monitoring signal;
    wherein when the monitoring signal indicates that the power supply enters a light loading status, the control signal generating circuit lowers the voltage level of the control signal which is configured to conduct the switch transistors by at least one-third.

7. The power supply of claim 6, wherein the monitoring circuit is a temperature control circuit, and the monitoring signal is configured to indicate an operating temperature of the power supply.

8. The power supply of claim 6, wherein the control signal generating circuit controls a number of conductive switch transistors among the switch transistors according to the monitoring signal.

9. The power supply of claim 8, wherein when the monitoring signal indicates that the power supply enters an extremely light loading status, the control signal generating circuit conducts only one of the switch transistors.

10. The power supply of claim 6, wherein the circuitry is a power factor correction circuit, a pulse-width modulation circuit or a synchronization rectification circuit.

* * * * *